United States Patent [19]

Riubrugent

[11] Patent Number: 5,145,690
[45] Date of Patent: Sep. 8, 1992

[54] HAMBURGER MAKING MACHINE
[75] Inventor: Narcis G. Riubrugent, Gerona, Spain
[73] Assignee: Industrias Gaser, S.L., Gerona, Spain
[21] Appl. No.: 726,568
[22] Filed: Jul. 8, 1991
[30] Foreign Application Priority Data
Jul. 27, 1990 [ES] Spain .................................. 9002030
[51] Int. Cl.⁵ .............................................. A22C 7/00
[52] U.S. Cl. .................................. 425/89; 425/136;
425/142; 425/145; 425/169; 425/298; 425/317;
426/231; 426/513
[58] Field of Search ................. 425/89, 110, 117, 122,
425/123, 136, 137, 142, 145, 169, 214, 215, 289,
298, 317; 426/231, 513

[56] References Cited
U.S. PATENT DOCUMENTS

| | | | |
|---|---|---|---|
| 2,226,442 | 12/1940 | Rumsey, Jr. ........................ | 426/513 |
| 3,347,176 | 10/1967 | Hall ..................................... | 426/513 |
| 3,394,646 | 7/1968 | Cunningham et al. ............. | 425/298 |
| 4,193,167 | 3/1980 | Orlowski et al. ................... | 425/142 |
| 4,592,916 | 6/1986 | Akesson ............................. | 425/298 |
| 4,741,916 | 5/1988 | Heidel et al. ....................... | 425/298 |

Primary Examiner—Jay H. Woo
Assistant Examiner—James P. Mackey
Attorney, Agent, or Firm—McGlew & Tuttle

[57] ABSTRACT

The meat duct (6) is equipped with a gate (17) to cut the meat supply at intervals and with a plate (14) to regulate the passage of the meat (7). The sheet material paper rolls (9, 10) to wrap the hamburger have respective inertial brakes (26) and sensors (25) which, when the paper runs out, touch the core (23) of the roll and stop the machine. One of the paper strips bears a series of marks (20) which, as they pass through the cell (21), cause the pressing die mechanism (11) to operate. In addition, there is a rod (40) which separates the chopped meat end contiguous to the hamburger, and another rod (41) which, when it ascends due to an obstruction, touches a microswitch and stops the machine. The paper scraps left over are driven by a pneumatic system (35) to a container (37).

8 Claims, 2 Drawing Sheets

HAMBURGER MAKING MACHINE

FIELD OF THE INVENTION

The present invention refers to an improved machine for making hamburgers and more particularly to a machine providing applications and important advantages which are achieved of a structural, functional, and practical nature over the hamburger making units known to date.

BACKGROUND OF THE INVENTION

Various machines are known which are designed to cut chopped meat or to manufacture hamburgers which ordinarily consist of a bench and a casing within which an electromagnet is housed, wherein the upper part of the machine assembly has a funnel or inlet channel connectable to a stamping or chopping machine with the task of supplying certain portions of meat. The same machine has two rolls of paper: one for the lower surface of the meat and the other for the upper surface. The chopped meat is walled in by the rolls of paper and, as it crosses an activated transverse knife activated by said electromagnet it is cut into rectangular pieces.

Also within the public domain is Spanish Invention Patent No. 489,258, which comprises a retaining bin for chopped meat, provided with a lower aperture for supplying the meat in strip form to a ramp. It also includes the feature wherein two strips of paper accompany the batch of meat on top and bottom to a molding blade for cutting, shaping, and pressing the meat strip. The blade features alternating up and down movements produced by a piston or motor and means to draw off the leftover paper scraps are provided.

In addition, Spanish Invention Patent No. 556,404 examines an automatic device for making hamburgers which, in summary, is composed of a frame articulated by a shaft to a bench, attached with the help of a choked bar by a threaded drive, and equipped with: a chopped meat feed inlet; a system to regulate the volume of meat formed by a screw in one piece with an internal plate; a transport system made up of polyethylene strips which are unwound from two rolls; and a descent ramp. The Spanish Addition Certificate No. 8700979 represents an improvement over the previous patent in the sense of adding to the machine a first cell so that the activating mechanism of the machine is connected once the previously shaped hamburger is ejected, as well as a second control cell which stops the machine as the ribbon of meat to be shaped comes to an end.

SUMMARY AND OBJECTS OF THE INVENTION

It is an object of the present invention to include a series of features and details which improve a hamburger machine's efficiency, productivity, and safety, such as: the inclusion of a cell which, in combination with certain marks previously printed on the paper to wrap the hamburgers, detects the passing of the strip of paper, directing the activation of the hamburger shaping die; the expulsion of the excess paper scraps by a pneumatic drive; an antiblocking device; a device which detects when the paper on the rolls has run out; an inertial braking mechanism for at least one of the rolls; and the possibility of controlling the same machine jointly with the chopped meat supplying machine, either continuously or intermittently.

In order to facilitate the explanation, the present description includes drawings in which a practical embodiment has been represented, and which are cited only as a nonlimiting example of the scope of the present invention patent.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENT

Figure 1:
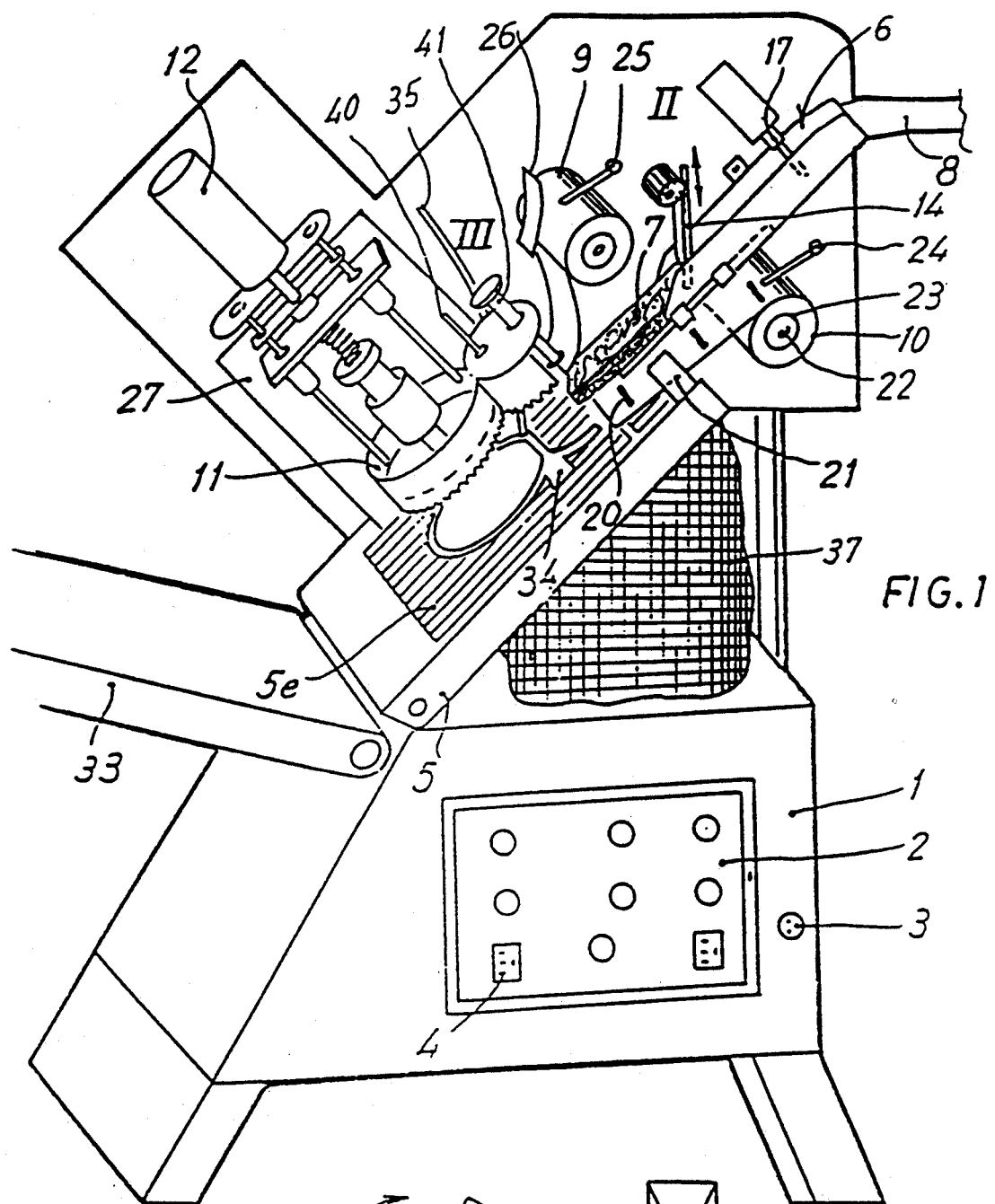
FIG. 1 illustrates a general view in perspective of the machine according to the present improvements.
Figure 2:
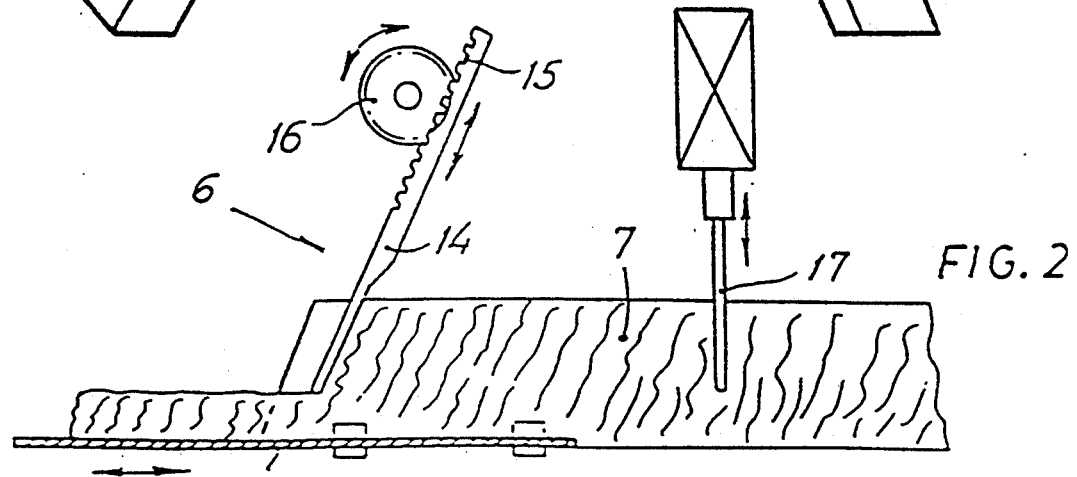
FIGS. 2 and 3 each correspond to expanded details of zones II and III indicated in FIG. 1.
Figure 3:
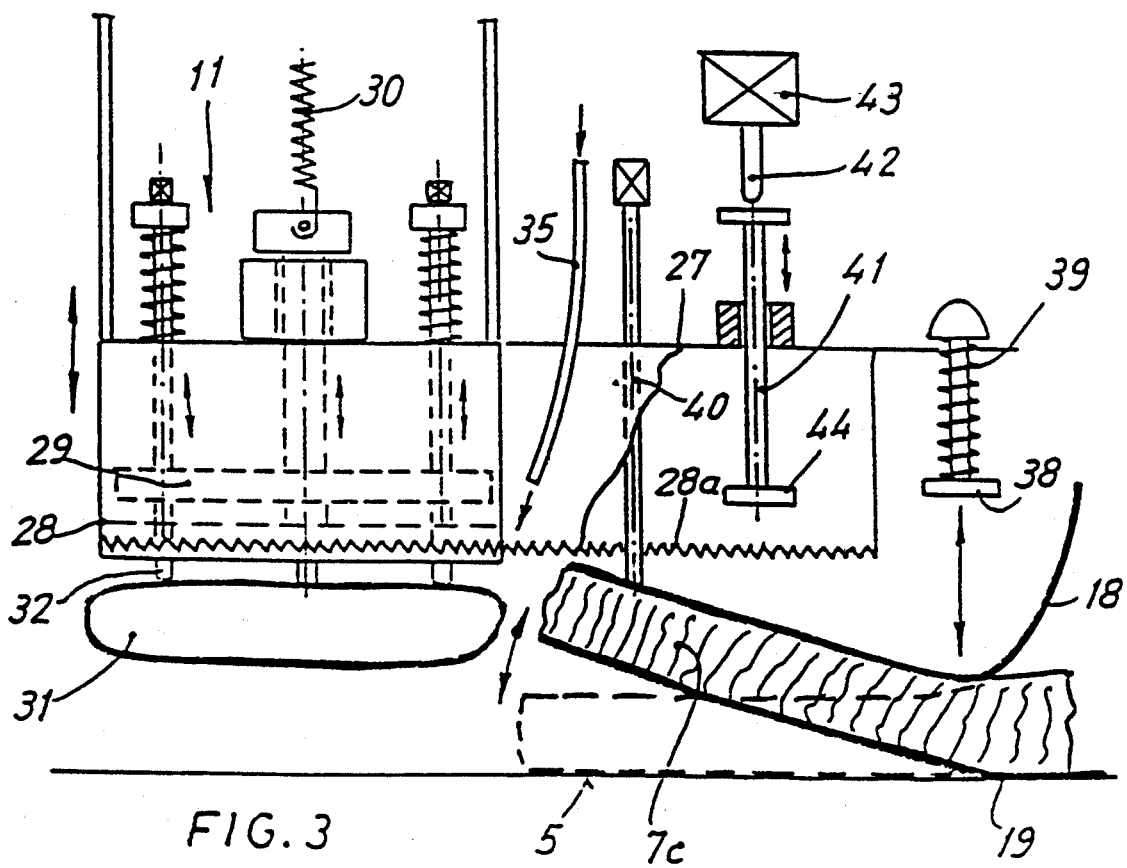

According to the FIGS. 1, 2, and 3, the improved hamburger making machine which is the object of the present invention consists of a cabinet type base 1 which contains the electrical system; the control panel 2 as well as sockets 3, 4 on the outside.

Above this base 1 there is a slanted platform 5 on which are assembled practically all the mechanisms of the machine; the adjustable automatic inlet mechanism 6, to introduce the chopped meat or batch 7, connected to the outlet of a packing machine or to a batch bin 8; the two rolls 9, 10 supplying flexible and transparent sheets such as cellophane; the cutting and shaping device 11; and the activation mechanism 12 of the device 11.

The chopped meat inlet mechanism 6 has certain sliding lateral guides 13 (see FIG. 2) which act as a brake on batch 7 so as to be able to work with any type of meat. In addition, inlet mechanism 6 has a type of slanted plate 14, whose upper end is serrated in the form of a rack 15 to which is geared a wheel 16; turning the wheel 16 in one direction or the other raises or lowers the plate 14, more or less blocking off the passage of the meat inlet feeder or mechanism 6, and therefore regulating the thickness or weight of the entering batch 7.

The feeding device also has a gate closure 17 which can cut off the supply where applicable, while the shaping-cutting device 11 continues to operate.

Rolls 9, 10 send the respective strips of cellophane 18, 19 over the upper surface and the lower surface of the chopped meat batch 7. One of the strips, the lower one 19 for example, bears a series of marks 20 the same distance apart as the length of a hamburger, with the purpose that once the mark 20 passes in front of a lower cell or photoelectric cell 21 this photoelectric cell 21 will detect it and direct the cutting and shaping device 11 to activate.

The same rolls are threaded over a fixed spindle 22 and have a metal core 23. A sensor 24, 25 is urged toward the core 23. As the cellophane runs out, the core receives direct contact from a respective sensor 24, 25, which directs the machine to stop. A conventional inertial brake 26 also works on the rolls 9, 10, preventing more paper or cellophane than necessary from unraveling from the roll.

Joined to the platform 5 is the frame 27 holding the hamburger cutting-shaping device 11 and other related items. This hamburger cutting-shaping device 11 basically consists of a die 28 with a serrated cutting edge activated by cylinder 12, whose contour is in the shape of a hamburger, plus a precutting edge 28a for the next portion of meat with cellophane. The same device 11 can be dismantled from the mentioned frame 27 for easy cleaning and also in order to replace it with another such device that would produce hamburgers of a different shape.

Inside the die 28 is the hamburger press 29 which is hidden inside the die when it descends to an end stop and produces the conformation of a hamburger. This press 29 is fastened to a spring 30 which is responsible for the fact that when the die 28 ascends, the hamburger 31 rises with it; at the end of the ascent the ejectors 32 are activated and, since they are fixed, they protrude and cause the detachment of the hamburger 31 already packaged together with the two sheets of paper, which then drops onto the ramp of the platform featuring a grooved area 5e, so that the hamburger 31 does not stick and ends up on a conveyor belt 33.

Figure 4:
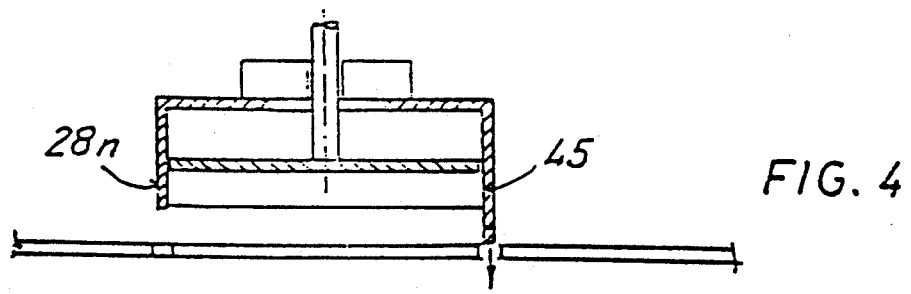
FIGS. 4 and 5 are a sectional view and a plan view of a variant of the die.
Figure 5:
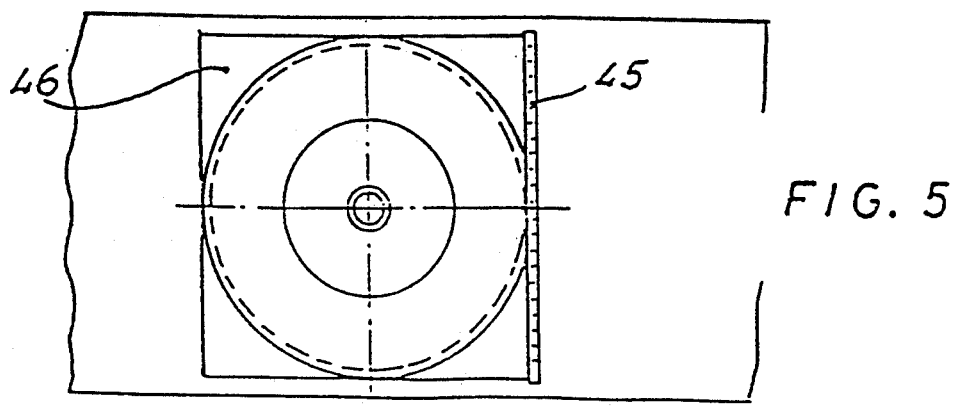

Below the mentioned die 28, on the base 5e, there are apertures 34 (see FIG. 1) which are struck by a current of air coming from the duct or nozzle 35, causing the excess paper or cellophane scraps to pass through the same apertures 34 and to stop at a lower bin 37, which may be a screen container. The respective mark 20 which served to activate the cell 21 will go with this excess scrap 36. Alternatively (FIGS. 4 and 5), the die 28n will have a straight and serrated transverse part 45 to cut the cellophane, positioned against another round, oval part, etc., for pressing without precutting. In such a case the die 28n will work on a square or rectangular aperture 46.

Going back over the course of the chopped meat, there is a small ramming device 38 with a spring 39 assembled on the same frame 27 of the die 28 which descends together with the die and perches on the upper strip of cellophane 18 so that this strip is positioned against the chopped meat 7c. In addition, there is a fixed vertical rod 40 with which the meat batch with cellophane collides when the chopped meat 7c rises together with the die 28 once the hamburger 31 has been cut, so that upon collision the chopped meat batch 7c is separated from the die 28 and drops, ending up on the platform 5.

Likewise, there is a rod 41 independent of the ascent and descent of the frame 27 of the die 28 whose upper end is next to the pushbutton 42 of a microswitch 43, while its lower end has an extension 44 meeting the passage of the chopped meat with cellophane 7c, so that if there is an accumulation of chopped meat the rod 41 would be forced to ascend, which would push the microswitch 43, stopping the machine and preventing obstructions.

All of the mechanisms described are covered by a protective system (not illustrated) which would cause the machine to stop automatically if it were opened and any danger to the operator were suspected.

Likewise, all of the soilable pieces can be disassembled so that they may be cleaned outside of the machine.

The machine according to the invention makes it possible to manufacture hamburgers of any shape with cellophane or transparent paper on both sides if desired, at truly high production speeds, wherein the weight of each hamburger is determined with great precision and wherein the paper is imprinted so that the printing or name, design, etc., is always centered on the hamburgers. In addition, this design makes it possible to connect the supply source to the same machine and to control all the equipment from the same drive. In this case, there is a system with a conventional relay or automated timer, not shown, designed to feed the machine in portions, consisting of making the stamping machine 8 operate at intervals marked by the automated system.

All of the electrical parts are protected in such a way that the humidity would not affect any of the components.

While a specific embodiment of the invention has been shown and described in detail to illustrate the application of the principles of the invention, it will be understood that the invention may be embodied otherwise without departing from such principles.

What is claimed is:

1. A hamburger making machine, comprising: a bench structure including a cabinet for supporting electrical and control elements, said bench structure including a platform with an upper part; chopped meat inlet channel means positioned on said bench structure upper part for receiving and transporting a supply of chopped meat and means for cutting off said supply of chopped meat at intervals; regulation means for regulating the passage of said chopped meat supply through said chopped meat inlet channel means; roller means for supporting rolls of flexible sheet material and for dispensing said flexible sheet material, said roller means including inertial brakes for regulating the dispensing of said flexible sheet material and end of roll detection means for detecting when said flexible sheet material has been consumed; press means, positioned and supported adjacent said bench structure, adjacent an outlet of said roller means and adjacent an outlet of said chopped meat inlet channel means, said outlet of said chopped meat inlet channel means and said outlet of said roller means being arranged such that said flexible sheet material is disposed above and below chopped meat exiting from said outlet of said chopped meat inlet channel means, said press means including a hamburger shaper element and a die press mechanism for cutting and shaping chopped meat into hamburger elements with said sheet material above and below the chopped meat; indicator marks positioned at intervals on said sheet material on one of said rolls; photoelectric cell means positioned between said roller means outlet and said press means for detecting said indicator marks and activating said press means responsive to detected indicator marks for forming individual hamburgers; rod means positioned adjacent said outlet of said chopped meat inlet channel means for acting on said chopped meat for restricting movement of said chopped meat for assisting separation of said chopped meat from meat being acted on by said press means, in conjunction with movement of said press means; antiblocking means, positioned adjacent with said chopped meat inlet channel means for detecting an obstruction in the form of an accumulation of chopped meat adjacent said outlet of said chopped meat inlet channel means and shutting off said press means in response to a detected obstruction; apertures formed in said platform; an air line positioned above said apertures for driving scraps of said sheet material through said apertures; serrations formed on said platform at a location below said press means, said serrations providing grooves for preventing a shaped hamburger from adhering to said platform; and endless conveyor means positioned adjacent a lower part of said platform for carrying away shaped hamburgers.

2. A machine according to claim 1, wherein said means for cutting off the chopped meat supply at intervals includes a gate element which is lowered independently of said die press mechanism.

3. A machine according to claim 2, wherein said regulation means for regulating the passage of said chopped meat supply includes a plate positioned inclined relative to said chopped meat inlet channel means, said plate having a toothed bar engaged with a corresponding rotary gear for raising and lowering said plate to expand and reduce a passage of said chopped meat inlet channel means.

4. A machine according to claim 1, wherein said chopped meat inlet channel means includes lateral guides, positioned on said bench structure upper part.

5. A machine according to claim 1, wherein said end of roll detection means comprises a roll formed with a metal core and an electrical terminal biased toward said sheet material roll, the consumption of said flexible sheet material causing said electrical terminal to contact said metal core for providing electrical contact causing said machine to stop.

6. A machine according to claim 2, wherein said die press mechanism is interchangeable and includes a straight part with serrations to cut said flexible sheet material, said straight part being positioned against another part of selected shape for pressing a hamburger.

7. A machine according to claim 1, wherein said chopped meat inlet channel means is connected to a continuous stamping machine, said continuous stamping machine providing an automatic system to supply chopped meat in portions.

8. A machine according to claim 1, wherein said antiblocking means includes a rod extending downwardly between said press means and said outlet of said chopped meat inlet channel means, said rod being connected to a micro switch.

* * * * *